(12) United States Patent
Moore et al.

(10) Patent No.: US 9,777,173 B2
(45) Date of Patent: *Oct. 3, 2017

(54) ENCAPSULATED TITANIUM DIOXIDE, FLUORESCENT PIGMENTS, AND PIGMENTED POLYURETHANE DISPERSION

(71) Applicant: XEROX CORPORATION, Norwalk, CT (US)

(72) Inventors: Kelley A. Moore, Salem, OR (US); Jeffery H. Banning, Cedar Rapids, IA (US); Jian Yao, Portland, OR (US); Jule W. Thomas, Jr., West Linn, OR (US); Jesus Gonzalez, Jr., Salem, OR (US)

(73) Assignee: XEROX CORPORATION, Norwalk, CT (US)

( * ) Notice: Subject to any disclaimer, the term of this patent is extended or adjusted under 35 U.S.C. 154(b) by 186 days.

This patent is subject to a terminal disclaimer.

(21) Appl. No.: 14/451,317

(22) Filed: Aug. 4, 2014

(65) Prior Publication Data

US 2016/0032121 A1   Feb. 4, 2016

(51) Int. Cl.
| | | |
|---|---|---|
| *C08G 18/08* | (2006.01) | |
| *C08G 18/48* | (2006.01) | |
| *C09D 11/102* | (2014.01) | |
| *C09D 11/322* | (2014.01) | |
| *C09D 11/326* | (2014.01) | |
| *C09D 11/50* | (2014.01) | |
| *C09D 175/04* | (2006.01) | |
| *C09D 175/08* | (2006.01) | |

(52) U.S. Cl.
CPC ........ *C09D 11/322* (2013.01); *C08G 18/0823* (2013.01); *C08G 18/48* (2013.01); *C09D 11/102* (2013.01); *C09D 11/326* (2013.01); *C09D 11/50* (2013.01); *C09D 175/04* (2013.01); *C09D 175/08* (2013.01)

(58) Field of Classification Search
CPC .. C09D 11/322; C09D 175/04; C09D 175/08; C09D 11/102; C09D 11/326; C09D 11/50; C08G 18/0823; C08G 18/48
See application file for complete search history.

(56) References Cited

U.S. PATENT DOCUMENTS

| | | |
|---|---|---|
| 5,231,135 A | 7/1993 | Machell et al. |
| 5,621,022 A | 4/1997 | Jaeger et al. |
| 5,637,638 A | 6/1997 | Chandler et al. |
| 5,700,851 A | 12/1997 | Banning et al. |
| 6,080,802 A * | 6/2000 | Emmons ............... B82Y 30/00 523/205 |
| 6,136,890 A * | 10/2000 | Carlson ............... C09D 11/326 523/160 |
| 6,221,137 B1 | 4/2001 | King et al. |
| 7,767,735 B2 * | 8/2010 | Koganehira ........... C09D 11/40 106/31.43 |
| 8,785,540 B2 * | 7/2014 | Muller .................. C08F 218/08 524/457 |
| 2006/0205869 A1 * | 9/2006 | Steidl ................ C08G 18/0823 524/591 |
| 2007/0060670 A1 | 3/2007 | Ellis |
| 2009/0169748 A1 | 7/2009 | House et al. |
| 2009/0232990 A1 * | 9/2009 | Ishiji ................... C09D 11/326 427/256 |
| 2009/0288580 A1 * | 11/2009 | Cai ........................ C09D 11/50 106/31.65 |
| 2012/0321863 A1 * | 12/2012 | O'Donnell ........... C08G 18/755 428/195.1 |
| 2013/0196124 A1 | 8/2013 | Flores et al. |
| 2014/0094559 A1 | 4/2014 | Lee et al. |
| 2014/0249248 A1 | 9/2014 | Lee et al. |
| 2014/0295152 A1 | 10/2014 | Brust et al. |
| 2016/0032117 A1 * | 2/2016 | Banning ............... C09D 11/30 524/591 |

FOREIGN PATENT DOCUMENTS

WO    WO 2013/062601 A1    5/2013

OTHER PUBLICATIONS

Thomas, Adrian, "Polyurethane Dispersions and Polyurethane/Acrylic Hybrid Dispersions for Coating and Printing Applications", Surface Coatings Australia, Sep. 2008, pp. 16-24.

* cited by examiner

*Primary Examiner* — Patrick Niland
(74) *Attorney, Agent, or Firm* — Pillsbury Winthrop Shaw Pittman LLP

(57) ABSTRACT

The present disclosure provides an encapsulated pigment dispersion and an inkjet ink comprising an ink vehicle and an encapsulated pigment dispersion thereof. In particular, the encapsulated pigment dispersion includes a pigment selected from $TiO_2$ pigment, fluorescent pigment, phosphorescent pigment, and mixtures thereof. The present disclosure also provides a process for producing the aqueous pigment.

15 Claims, 4 Drawing Sheets

ENCAPSULATED TITANIUM DIOXIDE, FLUORESCENT PIGMENTS, AND PIGMENTED POLYURETHANE DISPERSION

CROSS-REFERENCE TO RELATED APPLICATIONS

Reference is made to commonly owned and co-pending, U.S. patent application Ser. No. 14/451,357 entitled "Encapsulated Visible Light Absorbing Dye Polyurethane Dispersion" to Jeffrey Banning et al., electronically filed on the same day herewith; U.S. patent application Ser. No. 14/451,380 entitled "Encapsulated Fluorescent and Photochromic Dye Polyurethane Dispersion" to Jeffrey Banning et al., electronically filed on the same day herewith; U.S. patent application Ser. No. 14/451,408 entitled "Pigmented Polyurethane Dispersion" to Jeffrey Banning et al., electronically filed on the same day herewith; the entire disclosures of which are incorporated herein by reference in its entirety.

INTRODUCTION

Polyurethane dispersions have been employed as carriers in aqueous ink jet inks, for example, U.S. Pat. No. 5,700,851, and aqueous writing inks, for example, U.S. Pat. No. 5,637,638. The dispersions described in these patents employed reactive polymeric colorants that are built into the polyurethane backbone of the molecule by covalent bonding, and act as the source of coloration of the final ink.

Commercial "unstabilized" pigments, such as $TiO_2$ pigment, fluorescent pigment, and/or phosphorescent pigment are highly sought after for ink and coating application. However, encapsulating or incorporating these "unstabilized" pigments into the latex, in an emulsion polymerization, is not a trivial endeavor. This is because, during an emulsion polymerization, the commercial $TiO_2$, fluorescent, and/or phosphorescent pigments must satisfy the following requirements (1) be soluble in the monomers used in the emulsion polymerization, (2) be captured in a monomer micelle as emulsion polymerization takes place inside the micelle, and (3) be stable to the free radical polymerization environment. Many commercial $TiO_2$, fluorescent, and/or phosphorescent pigments are not stable to such environments and their colors are subsequently destroyed. Typically, even if the encapsulated commercial $TiO_2$, fluorescent, and/or phosphorescent pigments survive the entire polymerization process, it is often not stable to the free radical environment at the end of the process when all the excess monomers are destroyed under oxidative or reductive conditions. The encapsulation of commercial $TiO_2$, fluorescent, and/or phosphorescent pigments into a polyurethane dispersion circumvents all of these problems. The encapsulation of a $TiO_2$, fluorescent, and/or phosphorescent pigment into a polyurethane dispersion circumvents all of these problems.

It is important that ink compositions comprising pigment dispersion remain stable, not only in storage but also over repeated jetting cycles. Therefore, a need exists for a method to encapsulate commercial pigments into the latex, and to provide a highly stable pigment polyurethane dispersion, which may be used for ink-jet applications.

SUMMARY OF THE INVENTION

Figure 1:
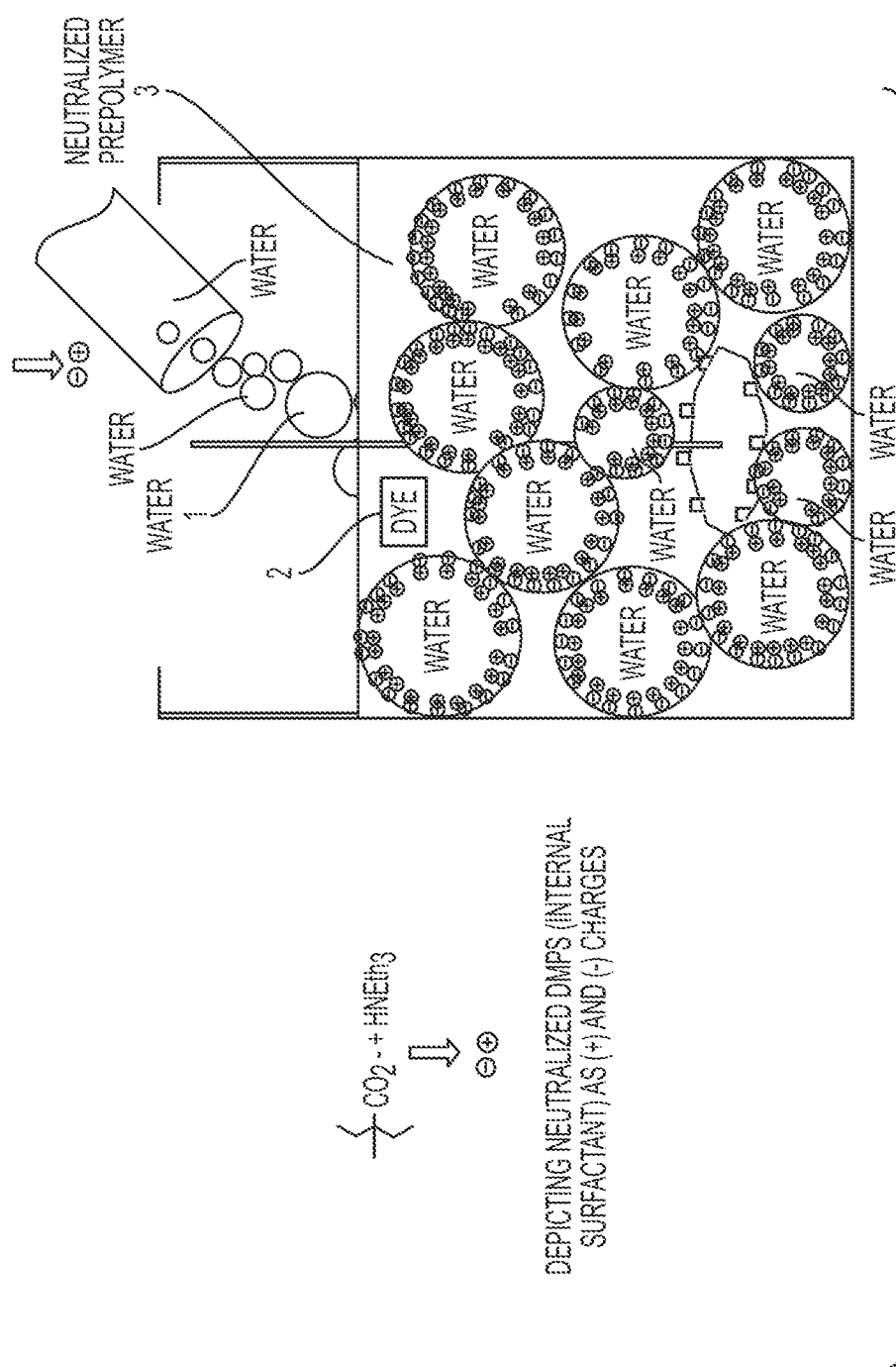
FIG. 1 shows a water-in-oil dispersion of a mixture of water and a neutralized prepolymer containing a visible dye according to certain embodiments of the present disclosure.

The disclosure provides an encapsulated pigment dispersion comprising: a polyurethane dispersion that is the reaction product of: (a) a urethane prepolymer, the urethane prepolymer being the catalyzed reaction product of: (i) a polyol; (ii) a polyisocyanate; and (iii) an internal surfactant; (b) a neutralizing agent; and (c) a chain extender; and a pigment selected from the group consisting of $TiO_2$ pigment, fluorescent pigment, phosphorescent pigment, and mixtures thereof, wherein the pigment is not reactive towards the polyisocyanate.

In further embodiments, the disclosure provides an encapsulated pigment dispersion comprising: a polyurethane dispersion that is the reaction product of: (a) a urethane prepolymer that is the catalyzed reaction product of: (i) a polyol; (ii) a polyisocyanate; and (iii) an internal surfactant; wherein the stoichiometric equivalent molar ratio of internal surfactant to polyol is from about 0.5 to about 2.0 and the stoichiometric equivalent molar ratio of NCO groups to total OH groups in the prepolymer is from about 1.2 to about 2.0; (b) a neutralizing agent; and (c) a chain extender; and an aqueous pigment dispersion comprising a pigment that is not reactive towards the polyisocyanate, wherein the pigment is encapsulated in the polyurethane dispersion; further wherein the encapsulated pigment dispersion has an average particle size of from about 20 nm to about 900 nm, a viscosity of from about 2 to about 150 cps at room temperature, and a surface tension of from about 15 to about 65 dyn at room temperature.

In embodiments, the disclosure also provides an ink jet ink composition comprising an encapsulated pigment dispersion comprising: a polyurethane dispersion that is the reaction product of: (a) a urethane prepolymer that is the catalyzed reaction product of: (i) a polyol; (ii) a polyisocyanate; and (iii) an internal surfactant; (b) a neutralizing agent; and (c) a chain extender; and a pigment selected from the group consisting of $TiO_2$ pigment, fluorescent pigment, phosphorescent pigment, and mixtures thereof, wherein the pigment is not reactive towards the polyisocyanate.

DETAILED DESCRIPTION

As used herein, the term "dispersion" means a two phase system where one phase consists of finely divided particles (often in the colloidal size range) distributed throughout a bulk substance, the particles being the dispersed or internal phase and the bulk substance the continuous or external phase. The bulk system is often an aqueous system.

As used herein, the term "PUD"" means the polyurethanes dispersions described herein.

As used herein, the term "DMPA" means dimethylol propionic acid.

Disclosure provides an encapsulated pigment dispersion including a polyurethane dispersion and an aqueous pigment dispersion including a pigment selected from $TiO_2$ pigment, fluorescent pigment, phosphorescent pigment, and mixtures thereof that is unreactive towards any reagent/or precursor of the urethane prepolymer (i.e., the polyol, the polyisocyanate, and/or the internal surfactant). The polyurethane dispersion of the disclosure is a reaction product of (a) a urethane prepolymer, (b) a neutralizing agent, and (c) a chain extender, where the urethane prepolymer is prepared from (i) a polyol, (ii) a polyisocyanate, and (iii) an internal surfactant.

When preparing the encapsulated pigment dispersion of the present disclosure, the pigment may be incorporated, or encapsulated, into the polyurethane dispersion by adding the pigment during the formation of the polyurethane dispersion, such as prior to the addition of a chain extender.

The preparation of encapsulated pigment dispersion requires a viscous prepolymer being first formed and then the commercial $TiO_2$ fluorescent, and/or phosphorescent pigments being added after the pre-polymer has been formed.

These commercial pigments are "unstabilized" and cannot be dispersed in water Therefore, if these pigments are added to the polyurethanes dispersions after they have been made, the pigments would simply "float" in the water portion of the latex. In the present disclosure, the commercial $TiO_2$ fluorescent, and/or phosphorescent pigments are added to the prepolymer or the components that are reacted to make the prepolymer (i.e., polyisocyanate, polyol & internal surfactant), as these pigments are soluble in these organics.

In certain embodiments, the encapsulated pigment dispersion may be prepared by a process including preparing a urethane prepolymer; reacting the urethane prepolymer with a neutralizing agent; water to the neutralized prepolymer to form an aqueous dispersion of the neutralized prepolymer; and reacting the aqueous dispersion of the neutralized prepolymer with a chain extender thereby producing an encapsulated pigment dispersion, wherein the step of preparing a urethane prepolymer include adding a pigment to the reaction mixture. For example, the pigment may be added to the mixture of polyol, polyisocyanate, and internal surfactant in the presence of a catalyst.

In certain embodiments, the encapsulated pigment dispersion may be prepared by a process including preparing a urethane prepolymer; adding a pigment to the urethane prepolymer; reacting the urethane prepolymer with a neutralizing agent to form a neutralized prepolymer; adding water to the neutralized prepolymer to form an aqueous dispersion of the neutralized prepolymer; and reacting the aqueous dispersion of the neutralized prepolymer with a chain extender thereby producing an encapsulated pigment dispersion.

In certain embodiments, the encapsulated pigment dispersion may be prepared by a process including preparing a urethane prepolymer; reacting the urethane prepolymer with a neutralizing agent to form a neutralized prepolymer; adding a pigment to the neutralized prepolymer; adding water to the neutralized prepolymer to form an aqueous dispersion of the neutralized prepolymer; and reacting the aqueous dispersion of the neutralized prepolymer with a chain extender thereby producing an encapsulated pigment dispersion.

The urethane prepolymer can be prepared by reacting a polyol, a polyisocyanate, and an internal surfactant in the presence of a catalyst. The internal surfactant may be dissolved in an organic solvent, such as NMP, DMF, or other polar aprotic solvents, prior to the addition to the polyol and polyisocyante.

Generally, the stoichiometric equivalent molar ratio of internal surfactant to polyol may be from about 0.5 to about 2, from about 0.75 to 1.75 to about 1 to about 1.5, the stoichiometric equivalent molar ratio of NCO groups to total OH groups in the prepolymer may be from about 1.0 to about 3.0, from about 1.25 to about 2.5 to about 1.5 to about 2.0. It is desired to have a high internal surfactant to polyol ratio and a low NCO group to OH group ratio. Typically, the urethane prepolymer reaction is carried out at about 70° C. to about 100° C. for about 1 to about 5 hours until the theoretical isocyanate content, which can be determined by, e.g., the di-n-butylamine titration method, is reached to form an urethane prepolymer (isocyanate-terminated) containing an internal surfactant therein.

This urethane prepolymer (isocyanate terminated prepolymer containing an internal surfactant therein) can be neutralized with a neutralizing agent, such as a trialkylamine, e.g., triethylamine. The amount of neutralizing agent used may be dependent upon the amount of internal surfactant present in the urethane prepolymer, and ranges from about 50% to about 110%, or from about 90% to about 105% of the quantity of internal surfactant. This neutralization step allows the urethane prepolymer to be dispersible by neutralizing the functional groups of the urethane prepolymer. In one embodiment, the carboxylic acid sites on the internal surfactants may be neutralized thereby forming a salt, such as $—CO_2^-HN^+R_3$, where R is a lower alkyl group.

Figure 2:
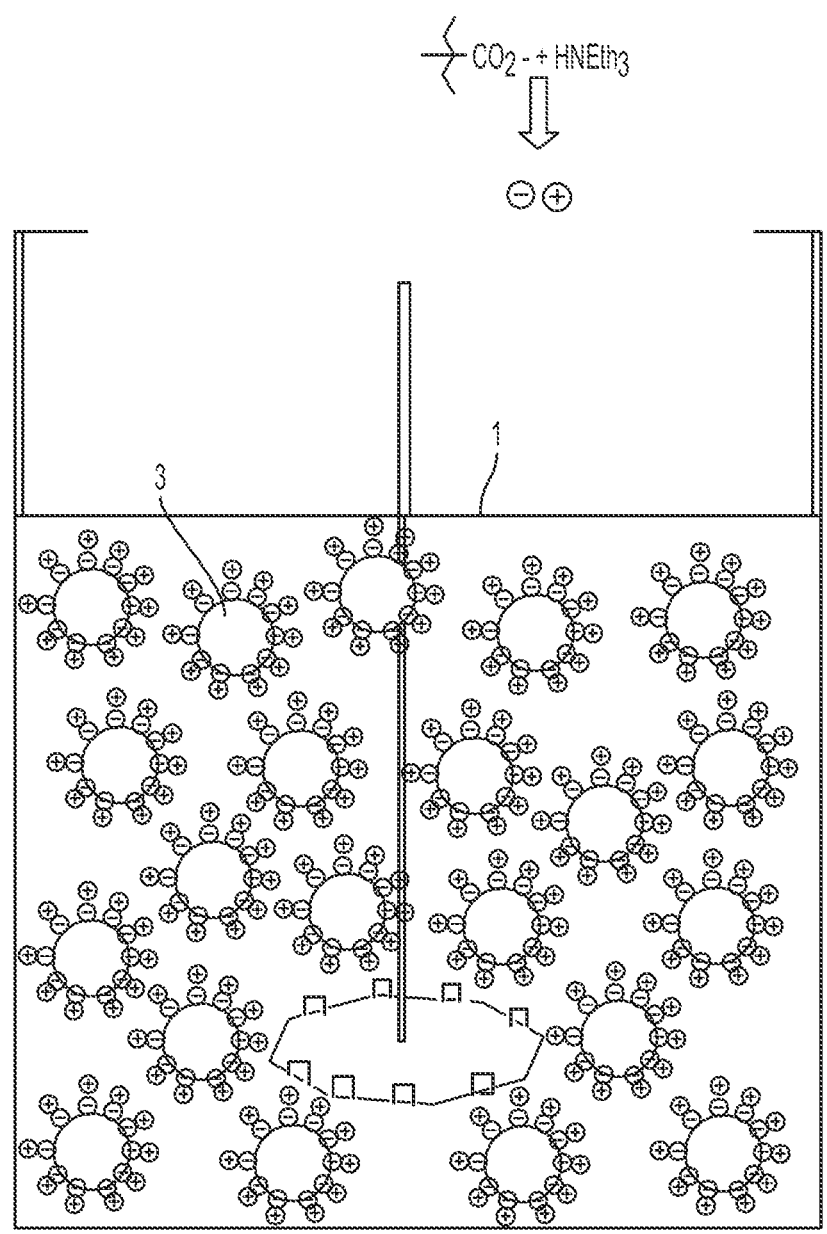
FIG. 2 shows an oil-in-aqueous dispersion of a mixture of water and a neutralized prepolymer containing a visible dye after high speed spinning according to certain embodiments of the present disclosure.
Figure 3:
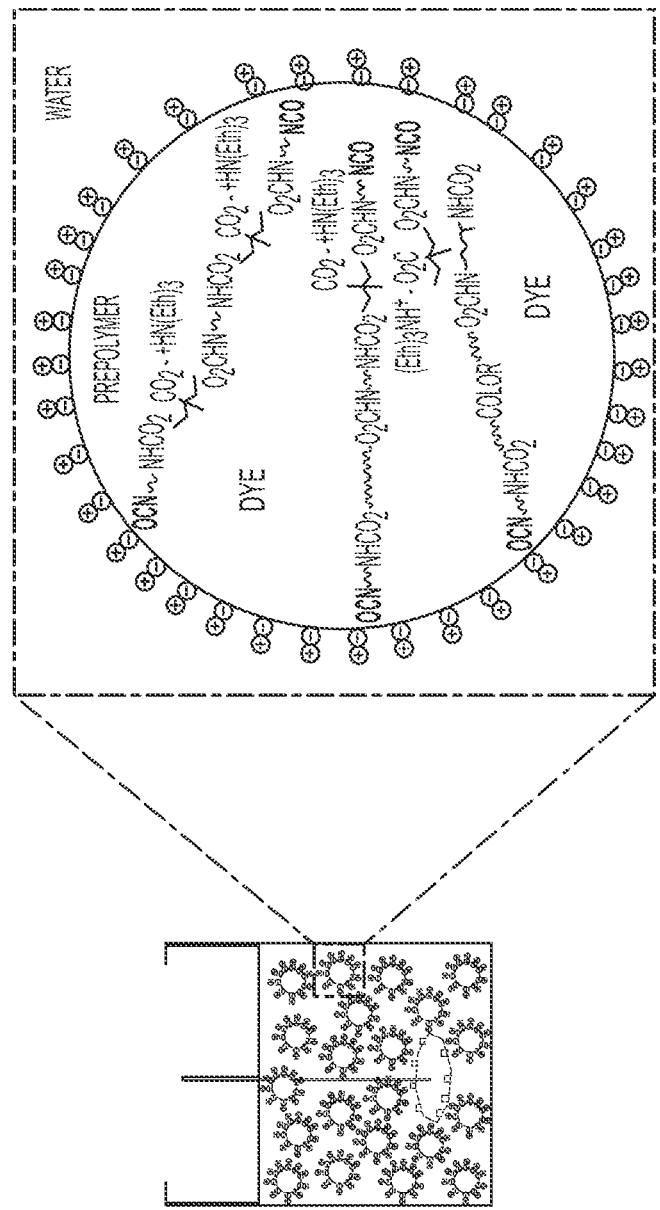
FIG. 3 shows a close up view of a single visible dye dispersion particle in water according to certain embodiments of the present disclosure.

The neutralized prepolymer, typically, has an average weight molecular weight (MW) of from about 5,000 to about 10,000, from 1,000 to about 20,000, from about 3,000 to about 15,000, or from about 5,000 to about 10,000. Water 1, e.g., deionized (DI) water, can be added to the neutralized prepolymer 3 which contains dye 2 which can be added during the formation of the prepolymer or after the formation of the prepolymer but prior to the addition of the neutralizing agent. The amount of water in the aqueous dispersion is based on the desired percentage of solids in the final polyurethane dispersion, which may be in amount of from about 1.0 to about 99 percent, from about 20 to about 80 or from about 35 to about 60 percent based on the total weight of the aqueous dispersion. The aqueous dispersion usually starts out as a "water-in-oil" dispersion the moment the water is added under disperion conditions. FIG. 1 shows a "water-in-oil" dispersion when water is first added to the neutralized prepolymer 3. During the dispersion process, the mixture (i.e., water and the neutralized prepolymer 3) may be spinned at high speed (e.g., 5,000-10,000 rpms) and the "water-in-oil" dispersion may be converted to an "oil-in-water" dispersion. The dispersion can be accomplished by spinning a blade, such as a dispersion blade 4. The effect of employing a dispersion blade at high speed imparts energy into the system to disperse rather than to mix. At this point, the particle size of the final encapsulated dye dispersion may be determined. FIG. 2 shows an "oil-in-water" dispersion, where the neutralized prepolymer 3 is suspended in the water. Inside a droplet of the neutralized prepolymer 3, the terminals (i.e., free $—NCO$ groups) of the neutralized prepolymer are at the inside surface of the droplet. In one embodiment of the disclosure, FIG. 3 shows a close up view of a single dispersion particle in water, where DMPA is employed as the internal surfactant.

Figure 4:
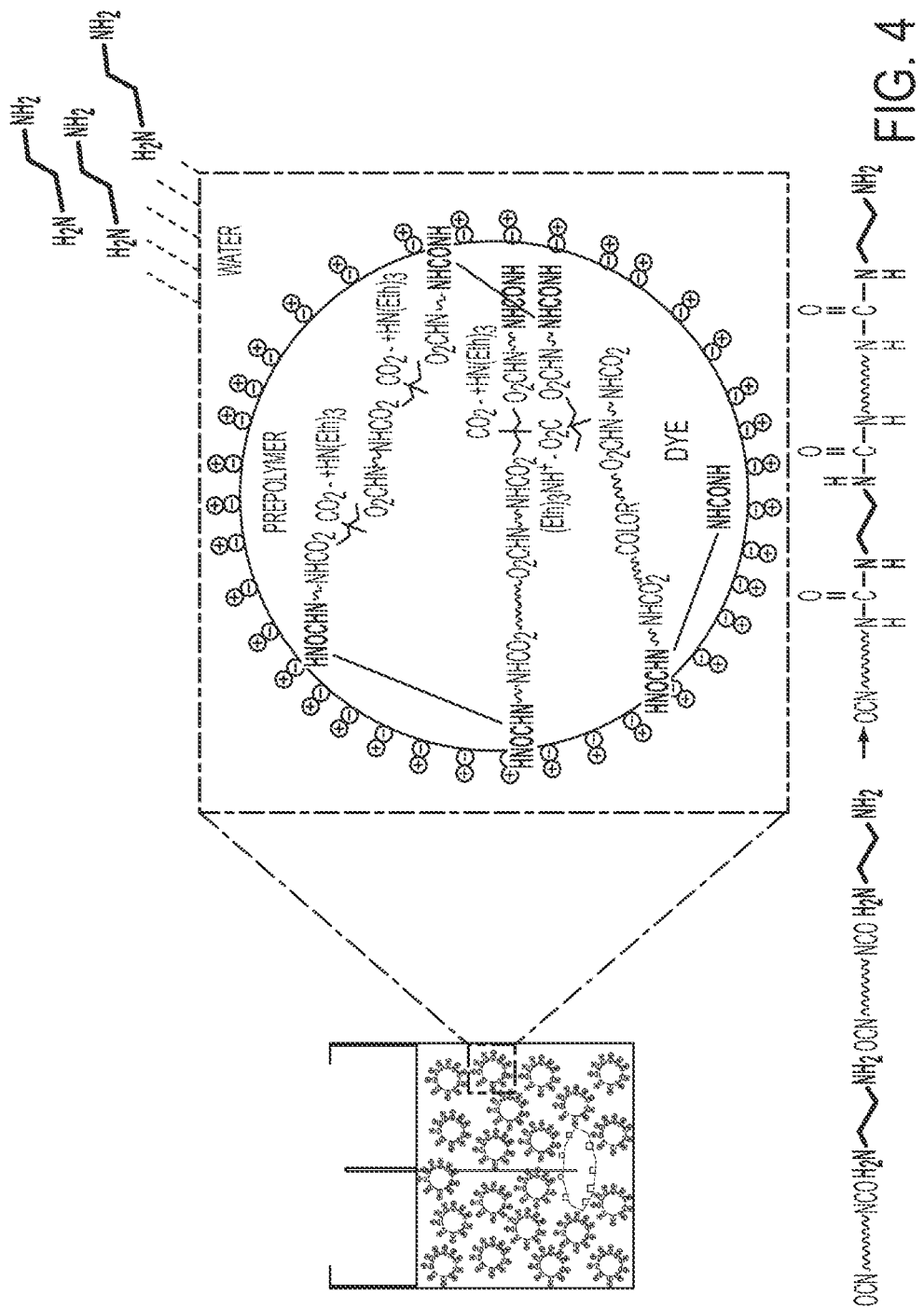
FIG. 4 shows a close up view of a single visible dye dispersion particle after the addition of a chain extender dispersion according to certain embodiments of the present disclosure.

A chain extender such as a suitable diamine, triamine, diol or a triol, may be then added to increase the average weight molecular weight of the polyurethane dispersion by using an amount stoichiometrically equivalent to from about 60 to about 100 percent of the amount of prepolymer, or from about 85 to about 95 percent of the amount of the prepolymer. The average weight molecular weight of the polyol employed and the particular chain extender used can impact the adhesion of the ink to the final receiving substrate. The chain extender may diffuse or migrate into the particles of the dispersion and react with the terminated free isocyanate groups of the neutralized prepolymer, and thus extend the molecular weight of the polyurethane polymer (correct?) and form ureas in the process. In one embodiment of the disclosure, FIG. 4 shows a close up view of a single dispersion particle after the addition of a chain extender, e.g., ethylene diamine in water, where DMPA is employed as the internal surfactant.

Examples of the chain extender suitable for use in the present disclosure include diamines such as ethylenediamine, 1,2-propanediamine, 1,6-hexamethylenediamine, piperazine, 2,5-dimethylpiperazine, isophoronediamine, 4,4'-dicyclohexylmethanediamine, 3,3'-dimethyl-4,4'-dicyclohexylmethanediamine, and 1,4-cyclohexanediamine; diamines containing one primary amino group and one secondary amino group such as N-hydroxymethylaminoethylamine, N-hydroxyethylaminoethylamine, N-hydroxypropylaminopropylamine, N-ethylaminoethylamine, and N-methylaminopropylamine; polyamines such as diethylenetriamine, dipropylenetriamine, and triethylenetetramine. In one embodiment, the chain extender includes ethylene diamine.

Any suitable amounts of prepolymer, neutralizing agent, water and chain extender may be added to the urethane prepolymer as long as a stable pigmented polyurethane dispersion is formed.

As a stirring/dispersing device for dispersing pigments, for example, various known dispensers such as a high speed impeller disc, an ultrasonic homogenizer, a high-pressure homogenizer, a paint shaker, a ball mill, a roll mill, a sand mill, a sand grinder, a dyno mill, dispermat, an SC mill, a nanomizer, or the like can be used.

The encapsulated pigment polyurethane dispersion is then combined with an aqueous medium, at least one humectant, and optionally at least one plasticizer.

The encapsulated pigment dispersion of the present disclosure may have an average dispersion particle size (i.e., particle diameter) of from about 20 nm to about 900 nm, from about 30 nm to about 600 nm, or from about 50 nm to about 100 nm. This size range permits the particles and the resultant ink in which they are dispersed to overcome settling and stability/dispersing problems. The average particle diameter can be measured by various methods, for example, they can be measured using a particle analyzer UPA 150 manufactured by Nikkiso Co., Ltd.

The encapsulated pigment dispersion of the present disclosure may have a viscosity of from about 2 to about 150 cps, from about 10 to about 100 cps, or from about 20 to about 80 cps at room temperature. The encapsulated pigment dispersion of the present disclosure may have a surface tension of from about 15 to about 65 dyn, from about 25 to about 60 dyn, or from about 35 to about 55 dynes, at room temperature.

The pigment content of the encapsulated pigment dispersion of the present disclosure may be in the range of from about 0.1 to about 30 percent, from about 1.0 to about 15 percent, or from about 2.0 to about 5.0 percent by weight of the encapsulated pigment dispersion. The pigment generally has an average pigment particle size (i.e., particle diameter) of from about 20 nm to about 900 nm, from about 50 nm to about 500 nm, or from about 100 nm to about 250 nm.

The pigments of the present disclosure are unreactive towards any reagent and/or precursor of the urethane prepolymer (i.e., the polyol, the polyisocyanate, and the internal surfactant). Particularly, the pigments do not contain any non-phenolic hydroxyl group or aliphatic primary or secondary amines, but may include a phenolic hydroxyl group and/or a tertiary amine in which one of the three substituents is an aromatic ring.

The pigments used in the present disclosure may contain $TiO_2$, fluorescent pigment, phosphorescent pigment, or any mixtures thereof.

Titanium dioxide ($TiO_2$) pigment useful in the present disclosure may be in the rutile or anatase crystalline form. It is commonly made by either a chloride process or a sulfate process. In the chloride process, $TiCl_4$ is oxidized to $TiO_2$ particles. In the sulfate process, sulfuric acid and ore containing titanium are dissolved, and the resulting solution goes through a series of steps to yield $TiO_2$. Both the sulfate and chloride processes are described in greater detail in "The Pigment Handbook", Vol. 1, 2nd Ed., John Wiley & Sons, NY (1988), the relevant disclosure of which is incorporated by reference herein for all purposes as if fully set forth. The titanium dioxide particles may have an average size of from about 50 to about 950 nanometers, from about 75 to about 750 nanometers, or from about 100 to about 500 nanometers. The titanium dioxide pigment is in and of itself white in color.

Fluorescent pigments absorb and reflect more light than conventional colors, which result in brighter and more powerful shades. Conventional color absorbs and re-emits a portion of the visible spectrum that matches its principal wavelength, while the remaining colors are absorbed and dissipated as heat. Fluorescent pigments use a larger amount of both the visible spectrum and the lower wavelengths compared to conventional colors. Fluorescent pigments not only absorb and convert light energy of the dominant wavelength, but also the wavelengths of ultraviolet rays and other colors lower in the visible spectrum. Any fluorescent pigment may be used in the present disclosure. The fluorescent pigment particle may be of a size from about 100 nm to about 2000 nm, from about 200 nm to about 1500 nm, or from about 300 nm to about 1000 nm. Examples of fluorescent pigments include those marketed by Day-Glo Color Corporation under the tradenames Splash Colors™ SPL-N and Echo Colors™ ECX. Both Day-Glo™ SPL-N and Day-Glo™ ECX fluorescent pigment particles are supplied as dispersions having a specific gravity of about 1.0-1.1. Day-Glo™ SPL-N dispersions are supplied as 46-50% solids with a particle size range of 0.25-0.40 microns. Day-Glo™ ECX dispersions are supplied as 42-46% solids with a particle size range of less than 0.20 microns.

Phosphorescent pigments are commonly referred to as glow-in-the-dark pigments, which have the ability to absorb energy and store it. Once the light source is removed, the phosphorescent pigments begin to give up that stored energy in the form of light. Phosphorescent pigments for use in accordance with the present disclosure include any such pigments within the purview of those skilled in the art. Suitable pigments include, in embodiments, ZnS pigments, including ZnS optionally doped with Mn and/or Cu. Such ZnS pigments include ZnS doped with Cu such as 2330, which is commercially available from USR Optonix Inc. and is available in sizes of from about 12 microns to about 30 microns, and possesses a green glow, and Sr2MgSi2O7, commercially available as P170 SPS BLUE from USR Optonix Inc., having a particle size of about 18 microns and a blue glow. Other examples of suitable phosphorescent pigments include alkaline earth aluminates and alkaline earth silicates. For example, a suitable alkaline earth aluminate includes LUMINOVA®, commercially available from Nemoto & Co., Ltd., which glows blue. Other suitable LUMINOVA® pigments, commercially available from Nemoto & Co., Ltd., include SrAl2O4 doped with Eu and Dy, such as those sold as G-300 having particle sizes of from about 2 to about 60 microns and those sold as GLL-300 having particle sizes of from about 2 to about 40 microns, Sr4Al14O25 doped with Eu and Dy having particle sizes of from about 2 to about 40 microns, such as those sold as BG-300 and BGL-300, and CaAl2O4 doped with Eu and Nd having particle sizes of from about 20 to about 60 microns, such as those sold as V-300, or admixtures of pigments such as those sold as B-300, which includes CaAl2O4 doped with Eu and Nd combined with Sr4Al14O25 doped with Eu and Dy. Also suitable are 14 micron NG-15 or 20 micron NG-20 ZnS doped with Cu, which glow yellow/orange; 18 micron NG-25 ZnS doped with Mn and Cu, which glows orange; 26 micron NGX-19 Sr2MgSi2O7 (doped with Dy and Eu) which glows blue; and 23 micron NGX-6Y SrAl2O4 (doped with Dy and Eu) which glows yellow green, all of which are commercially available from Dayglo.

As used herein, the term "polyol" is intended to include materials that contain two or more hydroxyl groups, e.g., diol, triol, tetraol, etc. The average weight molecular weight of the polyol may be in the range of from about 60 to about 10,000, from about 500 to about 5000, or from about 1000 to about 2000. Non-limiting examples of polyols include diols, triols, polyether polyols, polyacrylate polyols, polyester polyols, polycarbonate polyols, and combinations thereof. Suitable polyether polyol include, but are not limited to, polytetramethylene ether glycol (PTMEG), polyethylene propylene glycol, polyoxypropylene glycol, and mixtures thereof. The hydrocarbon chain can have saturated or unsaturated bonds and substituted or unsubstituted aromatic and cyclic groups. Suitable polyacrylate polyols include, but are not limited to, glycerol 1,3-diglycerolate diacrylate. Suitable polyester polyols include, but are not limited to, polyethylene adipate glycol; polybutylene adipate glycol; polyethylene propylene adipate glycol; o-phthalate-1,6-hexanediol; poly(hexamethylene adipate) glycol; and mixtures thereof. Suitable polycarbonate polyols include, but are not limited to, poly(polyTHFcarbonate)diol.

As used herein, the term "polyisocyanate" is intended to include materials that contain two or more isocyanate groups. The average weight molecular weight of the polyisocyanate may be in the range of from about 140 to about 1000, from about 168 to about 262, or from about 222 to about 680. Suitable polyisocyanates include diisocyanates, triisocyanates, copolymers of a diisocyanate, copolymers of a triisocyanate, polyisocyanates (having more than three isocyanate functional groups), and the like, as well as mixtures thereof. Examples of diisocyanates include isophorone diisocyanate (IPDI); toluene diisocyanate (TDI); diphenylmethane-4,4'-diisocyanate (MDI); hydrogenated diphenylmethane-4,4'-diisocyanate (H12MDI); tetra-methyl xylene diisocyanate (TMXDI); hexamethylene-1,6-diisocyanate (HDI); hexamethylene-1,6-diisocyanate; napthylene-1,5-diisocyanate; 3,3'-dimethoxy-4,4'-biphenyldiisocyanate; 3,3'-dimethyl-4,4'-bimethyl-4,4'-biphenyldiisocyanate; phenylene diisocyanate; 4,4'-biphenyldiisocyanate; trimethylhexamethylene diisocyanate; tetramethylene xylene diisocyanate; 4,4'-methylenebis(2,6-diethylphenyl isocyanate); 1,12-diisocyanatododecane; 1,5-diisocyanato-2-methylpentane; 1,4-diisocyanatobutane; dimer diisocyanate and cyclohexylene diisocyanate and its isomers; uretidione dimers of HDI; and the like, as well as mixtures thereof. Examples of triisocyanates or their equivalents include the trimethylolpropane trimer of TDI, and the like, isocyanurate trimers of TDI, HDI, IPDI, and the like, and biuret trimers of TDI, HDI, IPDI, and the like, as well as mixtures thereof. Examples of higher isocyanate functionalities include copolymers of TDI/HDI, and the like, and MDI oligomers, as well as mixtures thereof.

Suitable internal surfactants include both anionic and cationic internal surfactants. These include sulfonate diamines and diols, and dihydroxy carboxylic acids. In one embodiment, the internal surfactant is α,α-dimethylolpropionic acid (DMPA).

Any conventional urethane forming catalyst can be used in the prepolymer-forming reaction. Suitable urethane reaction catalyst, include, but are not limited to, dibutyl tindilaurate, bismuth tris-neodecanoate, cobalt benzoate, lithium acetate, stannous octoate, triethylamine, or the like.

The encapsulated pigment dispersions of the present disclosure may be used in inkjet inks. The inkjet inks of the present invention can be prepared by diluting the encapsulated pigment dispersion of the present invention with water or an aqueous solvent that contains water, and adding thereto other optional additives, e.g., humectant, plasticizier, conductibility agents, defoamers, anti-oxidants, corrosion inhibitors, bacteriocides, pH control agents, if necessary.

The ink jet ink compositions may include a humectant. Examples of humectants include, but are not limited to, alcohols, for example, glycols such as 2,2'-thiodiethanol, glycerol, 1,3-propanediol, 1,5-pentanediol, polyethylene glycol, ethylene glycol, diethylene glycol, propylene glycol and tetraethylene glycol; pyrrolidones such as 2-pyrrolidone; N-methyl-2-pyrrolidone; N-methyl-2-oxazolidinone; and monoalcohols such as n-propanol and iso-propanol. The humectant may be present in an amount from about 2% to about 20%, or from about 4% to about 10% by weight of the ink composition.

The ink jet ink compositions may include a plasticizer. Examples of plasticizers include, but are not limited to, aliphatic polyols, phthalate esters (such as 1,6-hexane diol and dioctylphthalate), and other urethane compatible plasticizers.

The ink jet ink compositions may also include other components to impart characteristics desirable for ink jet printing applications. These optional components include conductivity agents, defoamers, anti-oxidants and corrosion inhibitors which improve ink manufacturing and printer performance; bacteriocides, which prevent bacterial attack that fouls ink manufacturing equipment and printers; and pH control agents, which insure that the components of the ink composition remain soluble throughout the operable range of water contents as well as throughout the period of storage and use.

The ink jet ink compositions of the present disclosure have a high degree of transparency and brightness. The inks of the present disclosure may have a surface tension in the range of about 20 dynes/cm to about 70 dynes/cm, or in the range 30 dynes/cm to about 50 dynes/cm; a viscosity in the range of about 1.0 to about 10.0, or about 1.0 to about 5.0 centipoise at room temperature.

The encapsulated pigment dispersion particles remain stabilized or dispersed in a liquid carrying medium in the ink having a pH of from about 4 to about 10, from about 5 to about 9, or from about 6 to about 8.

EXAMPLES

The following Examples further illustrate the present invention. All parts and percentages are by weight and all temperatures are degrees Celsius unless explicitly stated otherwise.

Example 1

Preparation of Neutralized Pigmented Pre-Polymer

Pre-dissolved DMPA/NMP solution:

Into a 50 ml flask equipped with a Teflon coated stir magnetic was added 9.75 g of 2,2-bis(hydroxymethyl) propionic acid (DMPA, MW=134, available from Adrich Chemical of Milwaukee, Wis.) and 15.64 g of N-methylpyrrolidone (NMP). The mixture was heated at 70° C. with stirring until the DMPA was completely dissolved.

Pre-Polymer Formation:

Into a 1 L kettle equipped with a Trubore stirrer and Teflon stir paddle, temperature controller, 100 mL constant pressure addition funnel and $N_2$ inlet was charged 72.76 g pre-melted Terathane® 2000 (average Mn=2000 poly(tetrahydrofuran), available from Sigma-Aldrich). The kettle was secured in a bracket and the bottom ⅓ of the kettle was submerged in a 70° C. oil bath, and the contents were stirred for 15 minutes. The pre-dissolved DMPA/NMP solution was added to the kettle. After the contents were stirred for about 15 minutes, 42.4 g of isopherone diisocyanate (IPDI, MW=222, available from Huls America, Inc. of Piscataway, N.J.) was added to the kettle drop-wise through an addition funnel over about 30 minutes. A slight exotherm was observed. The reaction mixture was continued to be heated at 70° C. with stirring for about 3 hours and 45 minutes.

Neutralization and Incorporation of Pigment in Polyurethane Dispersion

Example 1a

The resulting mixture was added 3.0 g of Corona Magenta Pigment Sample A-21 [Day-Glo magenta] from the Day-Glo Color Corp and stirred for several minutes, followed by addition of about 7.35 g of triethylamine (MW=101) with continuous stirring and heating at 70° C. After stirring and heating for about 15 minutes the neutralized pre-polymer was ready to be dispersion. The kettle containing the neutralized pigmented pre-polymer was transferred to the dispersing apparatus with the dispersion blade about 0.25 inch below the surface of the neutralized pre-polymer.

Example 1b

The resulting mixture was added 7.35 g of triethylamine, followed by 7.6 g of solid titanium dioxide ($TiO_2$, anatase, nanopowder, 15 nm APS, from Nanostructured & Amorphous Material, Inc.) with continuous stirring and heating at 70° C. After stirring and heating for about 15 minutes the neutralized pre-polymer was ready to be dispersion. The kettle containing the neutralized pigmented pre-polymer was transferred to the dispersing apparatus with the dispersion blade about 0.25 inch below the surface of the neutralized pre-polymer.

Example 1c

The resulting mixture was added 7.35 g of triethylamine with continuous stirring and heating at 70° C. obtained a neutralized pre-polymer. Meanwhile into a 500-ml Erlenmeyer flask was charged 7.6 g of solid titanium dioxide ($TiO_2$, anatase, nanopowder, 15 nm APS, from Nanostructured & Amorphous Material, Inc.) and 245 ml of acetone, and the $TiO_2$/acetone was dispersed at the highest speed (~10,000 rpm) for about 10 seconds with IKA Crushing Disperser (T50 basic ULTRA-TURRAX). The pre-dispersed $TiO_2$/acetone was added to the neutralized pre-polymer. Acetone was distilled off at 80° C. by blowing nitrogen through. After 1 hour of distillation, a house vacuum was pulled for about 20 minutes to distill off the last bit of acetone. At this time, the neutralized pre-polymer was ready to be dispersion. The kettle containing the neutralized pigmented pre-polymer was transferred to the dispersing apparatus with the dispersion blade about 0.25 inch below the surface of the neutralized pre-polymer.

To the neutralized pigmented pre-polymers obtained from Examples 1a, 1b, or 1c were each added 245 mL of chilled (~5° C.) deionized water. The resulting mixtures were dispersed at the highest speed (approximately 7,500 rpms) with an IKA® Crushing Disperser for about 15 seconds. A long wood tongue depressor was employed to scrape off the un-dispersed pre-polymer stucked on the wall of the kettle. The un-dispersed pre-polymer was placed onto the bottom of the blade of the IKA® Crushing Disperser and dispersed again for about 10 seconds at the highest rpm setting. Aqueous pigment dispersions of the neutralized propolymer were obtained.

Example 2

Chain Extension

To the aqueous pigment dispersion of the neutralized propolymer obtained in Example 1 was added dropwise of an ethylene diamine solution (4.91 g ethylene diamine/10 g distilled water) over about 5 minutes. After stirring for about 1 hour, the resulting mixture was transferred to a 32 oz glass jar, capped and stored for at least 72 hours. At the end of the 72 hours, an encapsulated pigment dispersion was obtained (i.e., encapsulated Magenta-PUD pigment dispersion, or encapsulated $TiO_2$ pigment dispersion).

Example 3

Preparation of Aqueous Ink-Jet Inks

Into three separate 2-oz jars was each charged 10 g of a different encapsulated pigment dispersion obtained from Example 2, and 2 g of 0.1M pH8 $K_2HPO_4$/$KH_2PO_4$ buffer and 8 g DI water. The contents were stirred for about 2 minutes.

The resulting inks were loaded three separate empty ink cartridges for use in an EPSON WF-3540 printer, and prints were made of text and solid fill boxes on Xerox 4200 paper as well as Xerox Digital Color Elite Gloss paper.

Example 4

Analysis and Measurements

Approximately 20 g of each of the encapsulated pigment dispersions obtained in Example 2 was poured into a 100 mm×10 cm petri dish top or bottom and allowed to dry/coalesce over a 48 hour period. The samples were pealed out of the Petri dish for future analysis.

The encapsulated Magenta-PUD pigment dispersion was a clear, fluorescent pink colored solution. A small amount of solids settled after several weeks that appeared to be unencapsulated pigment. The average particle size of the encapsulated Magenta-PUD pigment dispersion particle was 25.83 nm as measured on a Zetasizer 6.34 by Malvern.

The encapsulated $TiO_2$ pigment dispersion was a white colored solution.

What is claimed is:

1. An encapsulated pigment dispersion comprising:
a polyurethane dispersion that is the reaction product of:
(a) a urethane prepolymer, the urethane prepolymer being the catalyzed reaction product of:
(i) a polyol;
(ii) a polyisocyanate; and
(iii) an internal surfactant;
(b) a neutralizing agent; and
(c) a chain extender selected from the group consisting of ethylenediamine, 1,2-propanediamine, 1,6-hexamethylenediamine, piperazine, 2,5-dimethylpiperazine, isophoronediamine, 4,4'-dicyclohexylmethanediamine, 3,3'-dimethyl-4,4'-dicyclohexylmethanediamine, 1,4-cyclohexanediamine, N-hydroxymethylaminoethylamine, N-hydroxyethylaminoethylamine, N-hydroxypropylaminopropylamine, N-ethylaminoethylamine, N-methylaminopropylamine, diethylenetriamine, dipropylenetriamine, triethylenetetramine, and mixtures thereof; and
a pigment selected from the group consisting of $TiO_2$ pigment, fluorescent pigment, phosphorescent pigment, and mixtures thereof, wherein the pigment is not reactive towards the polyisocyanate;
wherein the encapsulated pigment dispersion is obtained by the process comprising:
preparing a urethane prepolymer;
reacting the urethane prepolymer with a neutralizing agent to form a neutralized prepolymer;
adding a pigment to the neutralized prepolymer;
adding water to the neutralized prepolymer to form an aqueous dispersion of the neutralized prepolymer; and
reacting the aqueous dispersion of the neutralized prepolymer with a chain extender thereby producing an encapsulated pigment dispersion;
wherein the step of reacting the urethane prepolymer with a neutralizing agent to form a neutralized prepolymer occurs prior to the step of reacting the aqueous dispersion of the neutralized prepolymer with a chain extender thereby producing an encapsulated pigment dispersion.

2. The encapsulated pigment dispersion of claim 1 having a viscosity of from about 2 to about 150 cps at room temperature.

3. The encapsulated pigment dispersion of claim 1 having a surface tension of from about 15 to about 65 dynes/cm at room temperature.

4. The encapsulated pigment dispersion of claim 1, wherein the stoichiometric molar ratio of internal surfactant to polyol is from about 0.5 to about 2 and the stoichiometric molar ratio of NCO groups to total OH groups in the prepolymer is from about 1 to about 3.

5. The encapsulated pigment dispersion of claim 1, wherein the pigment is present in the amount of from about 0.1 to about 30 percent by weight of the encapsulated pigment dispersion.

6. The encapsulated pigment dispersion of claim 1, wherein the polyol is selected from the group consisting of polyether polyols, polyester polyols, polyacrylate polyols, polycarbonate polyols, silicone-based polyols and combinations thereof.

7. The encapsulated pigment dispersion of claim 1, wherein the polyisocyanate is selected from the group consisting of aliphatic, cycloaliphatic, aromatic and heterocyclic polyisocyanates and combinations thereof.

8. The encapsulated pigment dispersion of claim 1, wherein the internal surfactant is selected from the group consisting of anionic internal surfactants, cationic internal surfactants and combinations thereof.

9. The encapsulated dye dispersion of claim 1, wherein the internal surfactant comprises dimethylopropionic acid.

10. The encapsulated pigment dispersion of claim 1, wherein the neutralizing agent comprises trialkylamine.

11. The encapsulated pigment dispersion of claim 1, wherein the neutralized prepolymer has an weight average molecular weight of from about 1,000 to about 20,000.

12. The encapsulated pigment dispersion of claim 1, wherein a step of adding a pigment occurs after reacting the urethane prepolymer with a neutralizing agent and before adding an aqueous dispersion to the neutralized prepolymer.

13. An encapsulated pigment dispersion comprising:
a polyurethane dispersion that is the reaction product of:
(a) a urethane prepolymer that is the catalyzed reaction product of:
(i) a polyol;
(ii) a polyisocyanate; and
(iii) an internal surfactant;
wherein the stoichiometric equivalent molar ratio of internal surfactant to polyol is from about 0.5 to about 2.0 and the stoichiometric equivalent molar ratio of NCO groups to total OH groups in the prepolymer is from about 1.2 to about 2.0;
(b) a neutralizing agent; and
(c) a chain extender selected from the group consisting of ethylenediamine, 1,2-propanediamine, 1,6-hexamethylenediamine, piperazine, 2,5-dimethylpiperazine, isophoronediamine, 4,4'-dicyclohexylmethanediamine, 3,3'-dimethyl-4,4'-dicyclohexylmethanediamine, 1,4-cyclohexanediamine, N-hydroxymethylaminoethylamine, N-hydroxyethylaminoethylamine, N-hydroxypropylaminopropylamine, N-ethylaminoethylamine, N-methylaminopropylamine, diethylenetriamine, dipropylenetriamine, triethylenetetramine, and mixtures thereof; and
an aqueous pigment dispersion comprising a pigment that is not reactive towards the polyisocyanate, wherein the pigment is encapsulated in the polyurethane dispersion;
further wherein the encapsulated pigment dispersion has a viscosity of from about 2 to about 150 cps at room temperature, and a surface tension of from about 15 to about 65 dynes/cm at room temperature;
wherein the encapsulated pigment dispersion is obtained by the process comprising:
preparing a urethane prepolymer;
reacting the urethane prepolymer with a neutralizing agent to form a neutralized prepolymer;
adding an aqueous dispersion comprises water to the neutralized prepolymer to form an aqueous dispersion of the neutralized prepolymer; and
reacting the aqueous dispersion of the neutralized prepolymer with a chain extender thereby producing an encapsulated pigment dispersion;

wherein the step of reacting the urethane prepolymer with a neutralizing agent to form a neutralized prepolymer occurs prior to the step of reacting the aqueous dispersion of the neutralized prepolymer with a chain extender thereby producing an encapsulated pigment dispersion.

14. An ink jet ink composition comprising an encapsulated pigment dispersion comprising:
a polyurethane dispersion that is the reaction product of:
(a) a urethane prepolymer that is the catalyzed reaction product of:
(i) a polyol;
(ii) a polyisocyanate; and
(iii) an internal surfactant;
(b) a neutralizing agent; and
(c) a chain extender selected from the group consisting of ethylenediamine, 1,2-propanediamine, 1,6-hexamethylenediamine, piperazine, 2,5-dimethylpiperazine, isophoronediamine, 4,4'-dicyclohexylmethanediamine, 3,3'-dimethyl-4,4'-dicyclohexylmethanediamine, 1,4-cyclohexanediamine, N-hydroxymethylaminoethylamine, N-hydroxyethylaminoethylamine, N-hydroxypropylaminopropylamine, N-ethylaminoethylamine, N-methylaminopropylamine, diethylenetriamine, dipropylenetriamine, triethylenetetramine, and mixtures thereof; and
a pigment selected from the group consisting of TiO$_2$ pigment, fluorescent pigment, phosphorescent pigment, and mixtures thereof, wherein the pigment is not reactive towards the polyisocyanate;
wherein the encapsulated pigment dispersion is obtained by the process comprising:
preparing a urethane prepolymer;
reacting the urethane prepolymer with a neutralizing agent to form a neutralized prepolymer;
adding an aqueous dispersion comprises water to the neutralized prepolymer to form an aqueous dispersion of the neutralized prepolymer; and
reacting the aqueous dispersion of the neutralized prepolymer with a chain extender thereby producing an encapsulated pigment dispersion;
wherein the process further includes a step of adding a pigment which occurs prior to reacting the aqueous dispersion of the neutralized prepolymer with a chain extender;
wherein the step of reacting the urethane prepolymer with a neutralizing agent to form a neutralized prepolymer occurs prior to the step of reacting the aqueous dispersion of the neutralized prepolymer with a chain extender thereby producing an encapsulated pigment dispersion.

15. The ink jet ink of claim 14, wherein the encapsulated pigment dispersion has a viscosity of from about 2 to about 150 cps at room temperature, and a surface tension of from about 15 to about 65 dynes/cm at room temperature.

* * * * *